(12) United States Patent
Zhong et al.

(10) Patent No.: US 12,082,576 B2
(45) Date of Patent: Sep. 10, 2024

(54) DSC ELECTRODE SYSTEM CAPABLE OF APPLYING ELECTRIC FIELD

(71) Applicant: XI'AN JIAOTONG UNIVERSITY, Shaanxi (CN)

(72) Inventors: Lisheng Zhong, Shaanxi (CN); Xiaoyuan Song, Shaanxi (CN); Jinghui Gao, Shaanxi (CN); Qinxue Yu, Shaanxi (CN); Lin Liu, Shaanxi (CN); Jiaxi He, Shaanxi (CN); Yafei Li, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 1067 days.

(21) Appl. No.: 16/989,705

(22) Filed: Aug. 10, 2020

(65) Prior Publication Data

US 2021/0037812 A1 Feb. 11, 2021

(30) Foreign Application Priority Data

Aug. 8, 2019 (CN) .......................... 201910732217.4

(51) Int. Cl.
| | | |
|---|---|---|
| G01N 25/02 | (2006.01) | |
| A01N 1/02 | (2006.01) | |
| G01K 7/00 | (2006.01) | |
| G01K 17/00 | (2006.01) | |

(52) U.S. Cl.
CPC ......... *A01N 1/0252* (2013.01); *A01N 1/0294* (2013.01)

(58) Field of Classification Search
CPC .. A01N 1/0252; A01N 1/0294; A01N 1/0242; A01N 1/0284; G01N 25/4866; G01N 25/20
See application file for complete search history.

(56) References Cited

U.S. PATENT DOCUMENTS

| | | | | |
|---|---|---|---|---|
| 5,211,477 A | * | 5/1993 | Li ...................... | G01R 27/2635 374/33 |
| 5,842,788 A | * | 12/1998 | Danley .............. | G01N 25/4866 374/10 |
| 6,578,367 B1 | * | 6/2003 | Schaefer ............... | F25D 29/001 62/51.1 |
| 10,882,947 B2 | * | 1/2021 | Elgimiabi .......... | C08G 59/5026 |

FOREIGN PATENT DOCUMENTS

| | | | | |
|---|---|---|---|---|
| DE | 112007001888 T5 | * | 6/2009 | ............. G01K 17/00 |
| JP | H1092603 A | * | 9/1998 | |
| WO | WO-2005070923 A1 | * | 8/2005 | ........... A61K 31/343 |

OTHER PUBLICATIONS

Missal et al. Miniaturized ceramic differential scanning calorimeter with integrated oven and crucible in LTCC technology (Sensors and Actuators A 172 (2011) 21-26 (Year: 2011).*
Stewart Gillham, 4 Reasons Why Gold is an Amazing Metal and How to Recognize Fake Gold; Mar. 10, 2018 https://medium.com/@allwastematters/4-reasons-why-gold-is-an-amazing-metal-and-how-to-recognize-fake-gold-bebb5be41f5f (Year: 2018).*
Ma et al., Manipulating ice crystallization of 0.9 wt.% NaCl aqueous solution by alternating current electric field; Applied Physics Letters 102, 183701 (2013) (Year: 2013).*
Kaczmarczyk, A., Zanke, C., Senula, A., Grübe, M., & Keller, E. R. J. (Apr. 2009). Thermal analyses by differential scanning calorimetry for cryopreservation of potato shoot tips. In I International Symposium on Cryopreservation in Horticultural Species 908 (pp. 39-46). (Year: 2009).*
Gray House Studio et al. https://youtu.be/VwdH2vYiIXA?si=7CeRAeN5UpRxs8iX; Jan. 3, 2016 (Year: 2016).*
Alexander et al. Application of electric fields for controlling crystallization; CrystEngComm, 2019, 21, 5014 (Year: 2019).*

* cited by examiner

*Primary Examiner* — Arthur S Leonard
*Assistant Examiner* — Masudur Rahman

(57) ABSTRACT

A DSC (Differential Scanning calorimetry) electrode system capable of applying an electric field includes a differential scanning calorimeter, a computer, a signal generator, a self-pressurization liquid nitrogen tank and a reference crucible, wherein the self-pressurization liquid nitrogen tank is connected to the differential scanning calorimeter and used for controlling temperature in real time; the differential scanning calorimeter is connected to the computer and used for transmitting signals and recording experiment results. The DSC electrode system also includes a microelectrode crucible that includes a ceramic crucible, a ceramic crucible cover, welding spots, two electrodes and electrode wires, wherein the two electrodes are respectively fixed in the ceramic crucible; a gap is reserved between the electrodes and used for storing a tested sample; the welding spots are reserved at upper ends of the electrodes.

4 Claims, 4 Drawing Sheets

DSC ELECTRODE SYSTEM CAPABLE OF APPLYING ELECTRIC FIELD

CROSS-REFERENCE TO RELATED PATENT APPLICATION

This application claims priority to and the benefit of CN 2019107322174, filed Aug. 8, 2019, entitled "DSC Electrode System Capable of Applying Electric Field," by Lisheng Zhong et al. The entire disclosure of the above-identified application is incorporated herein by reference.

Some references, which may include patents, patent applications, and various publications, are cited and discussed in the description of the present invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

TECHNICAL FIELD

The present invention relates to the field of design of systems for observing factors affecting cryopreservation of biological materials and mechanisms thereof, in particular to a DSC electrode system capable of applying an electric field.

BACKGROUND

A biological dielectric medium is an important research direction in the interdisciplinary field of electromagnetism and biological materials, and the research on the biological dielectric medium is helpful for deepening understanding of interaction between the electromagnetism and the biological materials by people, and is helpful for promoting wider application of the biological dielectric medium. An important problem in existing biological material cryopreservation technologies is how to prevent the biological materials from low-temperature damage in a cooling process, and a main reason of the low-temperature damage is that water contained in biological tissues crystallizes in a freezing process to generate ice crystals, and thus chemical damage resulting from cell dehydration or physical damage resulting from cell membranes being punctured by the ice crystals is caused. Therefore, the operation of preventing the biological materials from low-temperature damage is mainly to inhibit crystallization of the water in the biological tissues in the cooling process.

At present, common biological material cryopreservation methods mainly include a rapid cooling method, a cryoprotectant adding method or a combination of them. However, the rapid cooling method is only applicable to preservation of biological materials with small sizes, and when biological materials needing to be preserved are large in size, a cooling speed of the interiors of the materials cannot be consistent with that of surfaces of the materials due to the influence of heat conduction; and the cryoprotectant adding method is not only complex to operate, but also has the problem that a cryoprotectant is difficult to remove after the materials are reheated, and in addition, part of cryoprotectants have a toxic effect on the biological materials, so that the application scenes of the cryoprotectant adding method are limited.

As water molecules are polar molecules, dipole polarization may be generated under the action of an applied electromagnetic field, the polarization effect may interfere with the balance of water molecule clusters, and further, a liquid-solid phase change property of the water molecules is influenced. Researches show that the electromagnetic field with proper external application conditions can inhibit crystallization of the water molecules in the biological tissues to a certain extent, so that the damage degree of the biological materials caused by low-temperature freezing is reduced.

At the present stage, related research on low-temperature freezing of the biological materials is mainly realized through microscopic observation. Experiment results of microscopic observation have intuitive and clear characteristics, but still have the following three problems: 1, an observed sample needs to be sheet-shaped and does not accord with an actual state of a biological material in actual application; 2, most of salt ions and ice crystals are colorless, thus making finer microscopic observation more difficult; and 3, subjective identification is often needed for result analysis of microscopic observation, a unified method is not provided, and more precise quantitative calculation and depth mechanism analysis are inconvenient to perform.

The traditional methods for measuring and verifying an action of an applied electric field to the biological material make further analysis by comparing different ice crystal forms of the water in the frozen biological tissues or different characters of the reheated biological materials, and thus real-time recording is not convenient. Differential scanning calorimetry (DSC) may be used for measuring a relation between a heat flows and temperatures of an input and output sample and a reference when the tested sample is heated, cooled, or maintained at a constant temperature, wherein a measurement signal is a change of energy absorbed or released by the tested sample and expressed in milliwatts (mW). In addition, DSC may also be used for detecting endothermic and exothermic effects, measuring peak areas (transformation enthalpy and reaction enthalpy), measuring temperature representing peaks or other effects, and measuring specific heat capacity. A differential scanning calorimeter is an instrument which is designed based on the principle of DSC and is applied to measuring the relation between the temperature and the heat flow related to internal thermal transformation of the material; and during measurement, the differential scanning calorimeter may generate a DSC curve, heat flow changes of the biological material under the low-temperature freezing and reheating conditions may be accurately recorded through the DSC curve, and thus enthalpy changes during formation and melting of the ice crystals are quantitatively calculated on a molecular level.

According to the present invention, electrodes are embedded in a crucible, a differential scanning calorimeter is used for synchronously monitoring heat flow changes of a biological material during freezing and reheating under the action of an electric field, and different influences of different electric field parameters on the formation of ice crystals in the biological material are compared, an effective method for controlling the low-temperature freezing crystallization property of the biological material through an applied electric field is further explored, and theoretical and experiment basis is provided for improving the cryopreservation efficiency through the applied electric field, so that a foundation is laid for cryopreservation of large-size biological tissues. Meanwhile, the method is also applicable to various fields in which phase change characters of solid or liquid materials need to be controlled, a new research method is provided for deep structures, mechanisms and the like of the materials, and has important significance.

The above information disclosed in the background section is merely used for enhancing understanding of the background of the present invention and thus may include information that does not constitute the prior art well known to those of ordinary skill in the art in this country.

Therefore, a heretofore unaddressed need exists in the art to address the aforementioned deficiencies and inadequacies.

SUMMARY

In view of above problems, an objective of the present invention is to provide a DSC (Differential Scanning calorimetry) electrode system capable of applying an electric field to overcome defects in the prior art, which is based on a principle of differential scanning calorimetry, monitors heat flow changes of a biological material in real time during freezing and reheating through a differential scanning calorimeter when an applied electric field exists, compares different influences of different electric field parameters on formation of ice crystals in the biological material, explores an optimal applied electric field parameter, effectively inhibits biological tissue damage caused by the ice crystals, and improves cryopreservation efficiency.

In order to achieve the above objective, the present invention provides a DSC electrode system capable of applying an electric field, including:

a differential scanning calorimeter used for detecting heat flow curves of a tested sample under freezing and reheating conditions caused by different electric field parameters;

a computer connected to the differential scanning calorimeter and used for transmitting signals and recording experiment results;

a self-pressurization liquid nitrogen tank connected to the computer and the differential scanning calorimeter respectively and used for cooling an inside of an experiment module of the differential scanning calorimeter;

a microelectrode crucible that includes a ceramic crucible, a ceramic crucible lid, two electrodes, electrode wires and welding spots, wherein the ceramic crucible is used for holding the electrodes and the tested sample, the ceramic crucible lid is used for preventing the tested sample from being excessively evaporated, the two electrodes are used for generating an electric field and are respectively fixed in the ceramic crucible, a gap is reserved between the electrodes and used for storing the tested sample, the electrode wires are used for connecting the electrodes with a signal generator, and the welding spots are reserved at upper ends of the electrodes and used for connecting the electrodes with the electrode wires;

the signal generator connected to one end of each electrode wire and used for providing an electrical signal so as to apply the electric field to the tested sample; and a reference crucible that includes a ceramic crucible and a ceramic crucible lid of which the specifications are consistent with the specifications of the ceramic crucible and the ceramic crucible lid of the microelectrode crucible, and is used for serving as an experiment reference in which an electric field is not applied to the tested sample.

The present invention further provides application of the DSC electrode system capable of applying the electric field in the field of cryopreservation of a biological material.

Compared with the prior art, the present invention has the following beneficial effects:

the DSC electrode system capable of applying the electric field provided by the present invention monitors the heat flow changes of the biological material in real time during freezing and reheating when the applied electric field exists, compares the different influences of the different electric field parameters on formation of the ice crystals in the biological material, and thus determines an optimal applied electric field parameter, effectively restrains the low-temperature damage of the biological material, and improves the cryopreservation efficiency of the biological material.

The above description is merely a summary of the technical solutions of the present invention. Specific implementation modes are illustrated in order to make technical means of the present invention clearer so as to make those skilled in the art implement the present invention in light of the contents of the specification, and in order to enable the above description and other objects, features, and advantages of the present invention to be more easily understood.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

Various other advantages and benefits of the present invention will become apparent to those of ordinary skill in the art upon reading the detailed description in the following preferred embodiments. Accompanying drawings are for the purpose of illustrating the preferred embodiments only and are not intended to limit the present invention. Obviously, the accompanying drawings in the following description only show some embodiments of the present invention, and other accompanying drawings may be obtained by those of ordinary skill in the art without paying creative labor based on these accompanying drawings. Furthermore, throughout the whole drawings, same components are indicated with same reference signs.

In the accompanying drawings:

FIG. 1 is a schematic structural diagram of a DSC electrode system capable of applying an electric field according to an embodiment of the present invention;

FIG. 2 is a schematic structural diagram of a microelectrode crucible according to an embodiment of the present invention;

FIG. 3 is a section view of a microelectrode crucible according to an embodiment of the present invention;

FIG. 4 is a diagram of a result of a DSC performance test of a microelectrode crucible according to an embodiment of the present invention;

FIG. 5 is DSC curves of pure water which is reheated after freezing under different conditions according to an embodiment of the present invention; and FIG. 6 is DSC curves of normal saline which is reheated after freezing under different conditions according to an embodiment of the present invention.

DETAILED DESCRIPTION

Figure 1:
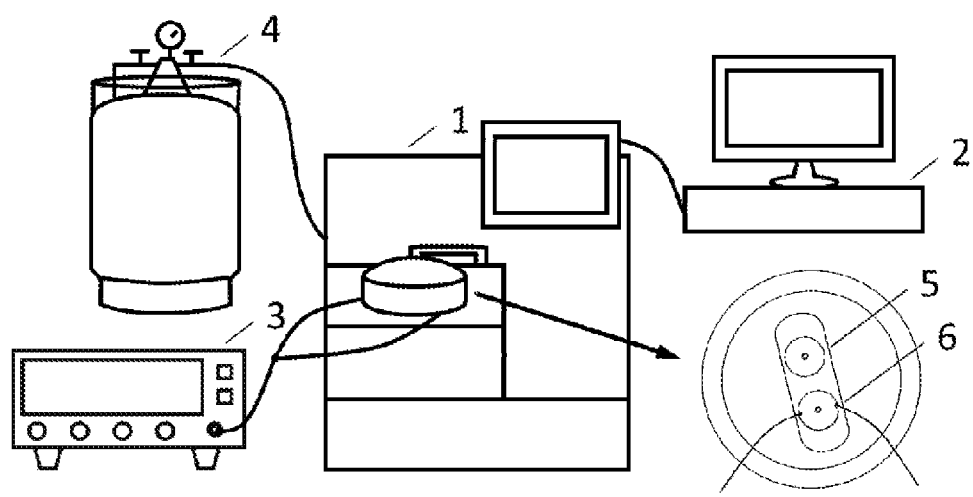

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

Specific embodiments of the present invention will be described in more detail below with reference to the accompanying drawings. Although the specific embodiments of the present invention are shown in the accompanying drawings, it should be understood that the present invention may be implemented in various forms and should not be limited by the embodiments set forth herein. On the contrary, these embodiments are provided to enable more thoroughly understand the present invention and to fully convey the scope of the present invention to those skilled in the art.

It should be noted that some words are used throughout the specification and claims to refer to particular components. It should be understood by those skilled in the art that different words may be used by those skilled in the art to refer to the same component. The specification and claims do not use differences in the words as a way for distinguishing the components but use differences in functions of the components as criteria for distinguishing the components. For example, a word, i.e., "include" or "comprise" mentioned in the specification and claims is an open-ended term, and should be interpreted as "including, but not limited to". Subsequent description in the specification refers to the preferred embodiments for carrying out the present invention, is for the purpose of a general principle of the specification, rather than limiting the scope of the present invention. The protection scope of the present invention is based on those defined by the appended claims.

In order to facilitate understanding of the embodiments of the present invention, the specific embodiments will be further explained below with reference to the accompanying drawings, and the various accompanying drawings do not constitute a limitation on the embodiments of the present invention.

In order to better understand, FIG. 1 is a schematic structural diagram of a DSC electrode system capable of applying an electric field according to an embodiment of the present invention. The DSC electrode system capable of applying the electric field includes:

- a differential scanning calorimeter 1 used for detecting heat flow curves of a tested sample under freezing and reheating conditions caused by different electric field parameters;
- a computer 2 connected to the differential scanning calorimeter and used for transmitting signals and recording experiment results;
- a self-pressurization liquid nitrogen tank 4 connected to the computer 2 and the differential scanning calorimeter 1 respectively and used for cooling an inside of an experiment module of the differential scanning calorimeter 1;
- a microelectrode crucible 6 that includes a ceramic crucible 61, a ceramic crucible lid 62, two electrodes 63, electrode wires 65 and welding spots 64, wherein the ceramic crucible 61 is used for holding the electrodes 63 and the tested sample, the ceramic crucible lid 62 is used for preventing the tested sample from being excessively evaporated, the two electrodes 63 are used for generating an electric field and are respectively fixed in the ceramic crucible 61, a gap is reserved between the electrodes 63 and used for storing the tested sample, the electrode wires 65 are used for connecting the electrodes 63 with a signal generator 3, and the welding spots 64 are reserved at upper ends of the electrodes 63 and used for connecting the electrodes 63 with the electrode wires 65;
- the signal generator 3 connected to one end of each electrode wire 65 and used for providing an electrical signal so as to apply the electric field to the tested sample; and
- a reference crucible 5 that includes a ceramic crucible and a ceramic crucible lid of which the specifications are consistent with the specifications of the ceramic crucible and the ceramic crucible lid of the microelectrode crucible 6, and is used for serving as an experiment reference in which an electric field is not applied to the tested sample.

The DSC electrode system capable of applying the electric field provided by the present invention monitors the heat flow changes of a biological material in real time during freezing and reheating when an applied electric field exists, compares the different influences of different electric field parameters on formation of ice crystals in the biological material, and thus determines an optimal applied electric field parameter, effectively inhibits the low-temperature damage of the biological material, and improves the cryopreservation efficiency of the biological material.

In a preferred embodiment, the electrodes 63 are fixed in the ceramic crucible 61 through a two-liquid mixed hardening glue, the electrodes 63 are oppositely placed and have smooth surfaces, and planes, in contact with the tested sample, of the electrodes 63 are strictly parallel to each other.

In a preferred embodiment, the electrode wires 65 are enameled wires with insulated outer surfaces; one end of each electrode wire 65 is connected to the corresponding electrode 63 in a welding manner and conducted, while the other end of each electrode wire is connected to a signal output end of the signal generator 3 through a transmission line; diameters of the electrode wires 65 are 0.1 mm-0.2 mm; and in a preferred embodiment, the gap between the electrodes 63 ranges from 0.2 mm to 1.0 mm.

In a preferred embodiment, the electrodes 63 are made from a corrosion-resistant conductive material.

In a preferred embodiment, the electrodes 63 are made from one of platinum, copper, gold and stainless steel.

In a preferred embodiment, bottoms of the electrodes 63 are in full contact with a bottom of the ceramic crucible 61.

In a preferred embodiment, two openings are drilled in symmetrical locations on two sides of the ceramic crucible lid 62, and depths of the openings are equivalent to a thickness of the ceramic crucible 61.

In a preferred embodiment, the computer 2 includes a temperature control program by which an experiment temperature of the differential scanning calorimeter 1 is controlled.

In a preferred embodiment, the electric field generated by the electrodes 63 is a uniform electric field.

The present invention provides a test system which utilizes the crucible arranged in the differential scanning calorimeter for generating the uniform electric field to act on the biological material so as to influence the low-temperature phase change of the biological material. The formation of ice crystals in the biological material can be controlled through the applied electric field generated by the crucible. The system provided by the present invention can record the differences of the ice crystals formed in the biological material in real time caused by different electric field parameters.

Figure 2:
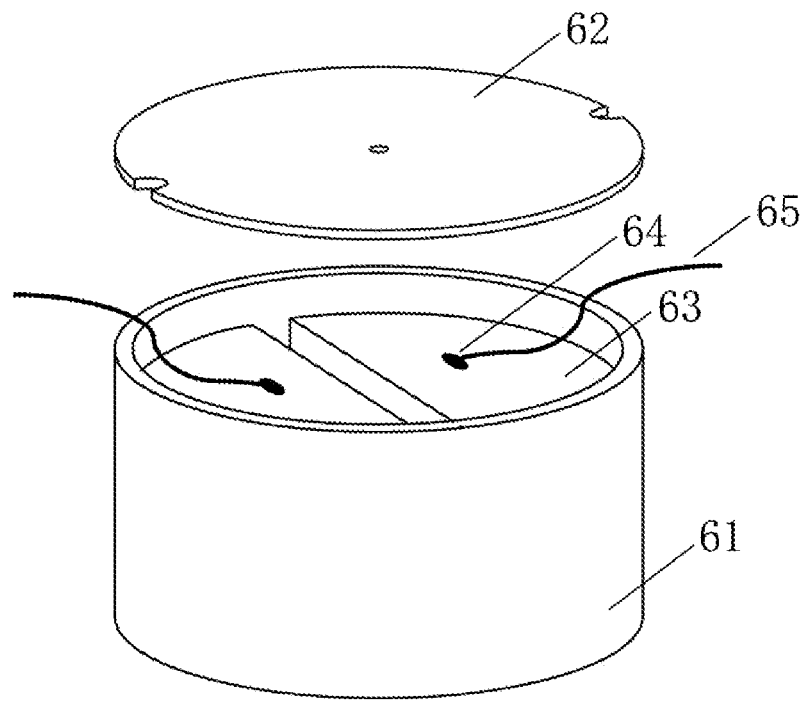
Figure 3:
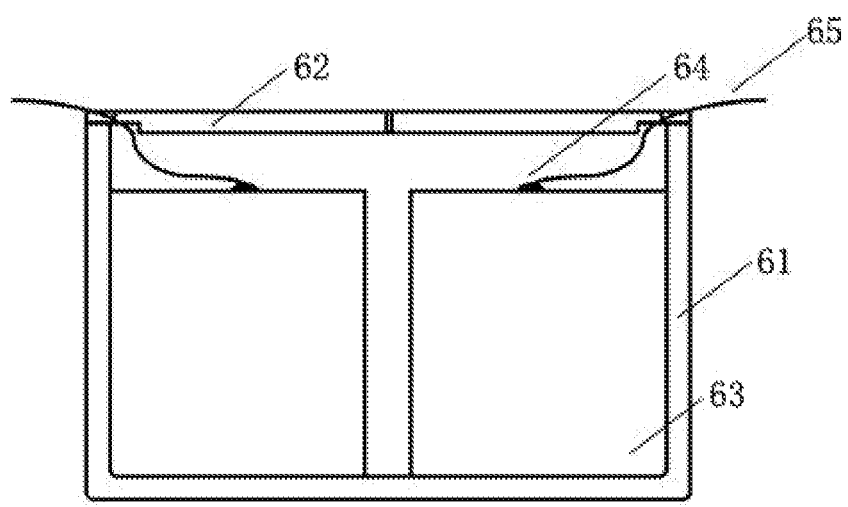

In order to further understand the present invention, in an embodiment, as shown in FIG. 2 and FIG. 3, the microelectrode crucible 6 includes the ceramic crucible 61, the ceramic crucible lid 62, the welding spots 64, the two electrodes 63 and the electrode wires 65; the two electrodes 63 are respectively fixed in the ceramic crucible 61, the gap is reserved between the electrodes 63 and used for storing the tested sample, the welding spots 64 are reserved at the upper ends of the electrodes, one end of each electrode wire 65 is connected to the corresponding welding spot 64 while the other end of each electrode wire 65 is connected to the signal generator 3 and used for applying the electric field to the electrodes.

Furthermore, an inner diameter and an inner height of the ceramic crucible 61 need to be matched with those of the differential scanning calorimeter 1.

Furthermore, a material selected from one of platinum, copper, gold and stainless steel is used to prepare the electrodes 63, and is cut into the two oppositely placed electrodes with same size and smooth surfaces, and the planes, needing to be in contact with the tested sample, of the electrodes are strictly parallel to each other.

Furthermore, the electrodes 63 are fixed to an inner side wall of the ceramic crucible 61 through a two-liquid mixed hardening glue, and the bottoms of the electrodes are in full contact with the bottom of the ceramic crucible 61, so that the bottoms of the electrodes 63 or the bottom of the ceramic crucible 61 are/is prevented from being polluted by the mixed hardening glue.

Furthermore, the electrode wires 65 are enameled wires with insulated outer surfaces; and one end of each electrode wire 65 is connected to the corresponding electrode 63 in a welding manner and conducted, while the other end of each electrode wire 65 is connected to the signal output end of the signal generator 3 through the transmission line after insulation varnish on the surfaces of the enameled wires are scraped.

Furthermore, the two openings are drilled in the symmetrical locations on two sides of the ceramic crucible lid 62, and the depths of the openings are equivalent to the thickness of the ceramic crucible 61, which ensures that the ceramic crucible lid 62 can fit the ceramic crucible 61 and the electrode wires 65 can penetrate through the openings at the same time, and meanwhile also ensures that the moisture in the tested sample is prevented from being excessively evaporated due to too large slots.

In the embodiment, the height of the electrodes 63 is matched with the amount of the tested sample, the gap between the electrodes 63 ranges from 0.2 mm to 1.0 mm, and the diameters of the electrode wires 65 are 0.1 mm-0.2 mm.

In the embodiment, the computer 2 further includes a temperature control program matched with the differential scanning calorimeter 1, and the program includes four stages as follows: stage 1, an initial temperature is set to be 4° C., and kept for 2 min; stage 2, the temperature is reduced to −60° C. at a rate of 3° C./min; stage 3: the temperature of −60° C. is kept for 3 min; and stage 4, the temperature is increased to 10° C. at the rate of 3° C./min.

In the embodiment, the signal generator 3 is configured with a signal input button for controlling start and stop of the applied electric field for the microelectrode crucible 6.

Figure 4:
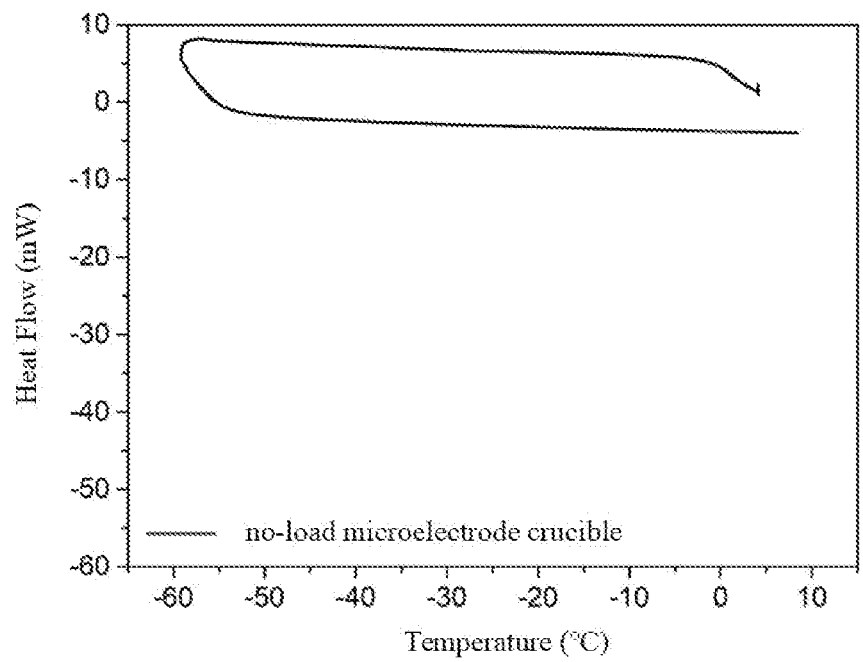

In the embodiment, before an experiment is carried out, a performance test needs to be carried out on the microelectrode crucible 6, and the purpose of the performance test is to ensure that the microelectrode crucible 6 is kept stable within a temperature range involved in an experiment process and avoid physical transformation or chemical reaction which interferes with the experiment process and result analysis. As shown in FIG. 4, the microelectrode crucible 6 is no-load, the differential scanning calorimeter 1 is used for measuring a heat flow curve within a temperature range that the temperature is reduced from 10° C. to −60° C. at the rate of 3° C./min and then returns to 10° C., and the result of FIG. 4 shows that the microelectrode crucible 6 is stable in performance within the above-mentioned temperature range, and free of obvious property changes such as melting, crystallization and glass state transformation, and meets experiment requirements.

The implementation modes and effects of the present invention are illustrated in detail below by two embodiments.

Embodiment 1

Ultrapure water (hereinafter referred to as Class I water) filtered and purified by a Millipore-D24UV pure water integrated system is used as an experiment sample, and a Q2000 DSC analyzer of the TA company is selected as a differential scanning calorimeter 1. The experiment steps as follows.

1) The experiment module of the differential scanning calorimeter 1 is opened, the reference crucible 5 and the microelectrode crucible 6 are placed at corresponding locations, the electrode wires 65 of the microelectrode crucible 6 are connected to the signal generator 3, and signal parameters to be output are set.
2) 4 µl of the Class I water is sucked into the electrodes 63 in the microelectrode crucible 6 in two times by using a microsyringe with the specification of 2 µl, the ceramic crucible lid 62 is closed, and the condition that the Class I water is completely injected into the gap between the electrodes 63 can be ensured in an operation process.
3) The temperature control program matched with the differential scanning calorimeter 1 is set in the computer 2, and the temperature control program includes four stages as follows: stage 1, the initial temperature is set to be 4° C., and kept for 2 min; stage 2, the temperature is reduced to −60° C. at the rate of 3° C./min; stage 3, the temperature of −60° C. is kept for 3 min; and stage 4, the temperature is increased to 10° C. at the rate of 3° C./min. After the program is set, the experiment module is closed, and the temperature control program is started.
(4) When the first stage is finished and the second stage is about to be started, the signal input button of the signal generator 3 is pressed down, and an applied electric field applied to the Class I water is started in a cooling process of the second stage.
(5) After the second stage is finished, the signal input button of the signal generator 3 is rebounded, and the applied electric field applied to the Class I water is stopped at the third stage and the fourth stage.
6) At the end of stage 4, a heat flow curve is exported by the differential scanning calorimeter 1 and stored in the computer 2.

Figure 5:
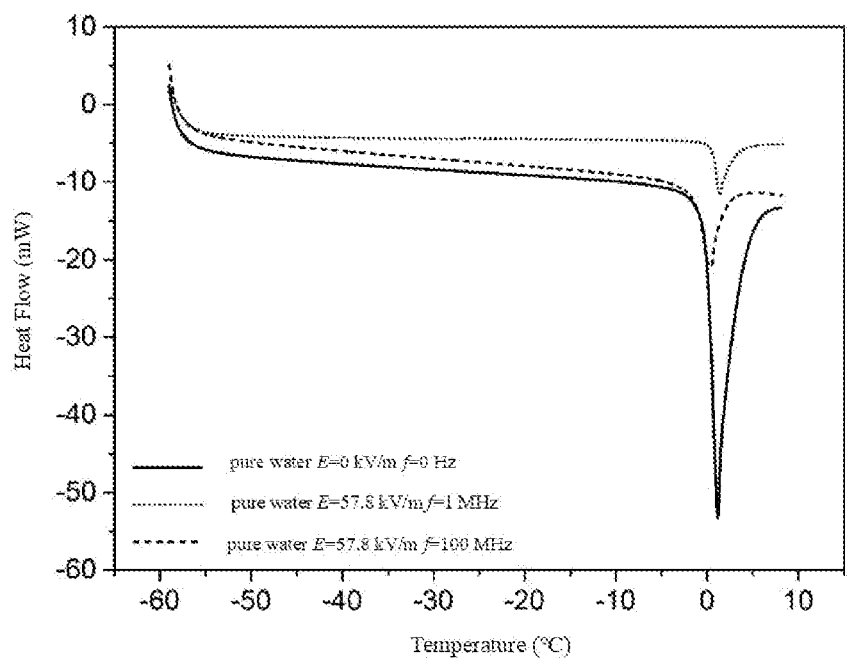

FIG. 5 shows DSC heat flow curves obtained by respectively applying 0 Hz, 100 kHz, 1 MHz electric field parameters to 4 µl of the Class I water during a low-temperature freezing process and reheating. It can be seen in the figure that after an electric field is applied to the Class I water in the low-temperature freezing process, a height of a melting peak of the Class I water is obviously reduced, and an area of the peak is obviously reduced. In the DSC heat flow curve, the area of the melting peak represents the melting enthalpy of the corresponding crystal form in the tested sample, and the larger the area of the melting peak is, the larger the melting enthalpy of the corresponding crystal form is, indicating that the tested sample contains more ice crystals. Therefore, formation of the ice crystals can be effectively reduced by applying the electric field to the Class I water in the low-temperature freezing process, and different applied electric field parameters correspond to different degrees of reduction of the area of the melting peak. It can be deduced from FIG. 5 that an optimal applied electric field parameter of the embodiment is 1 MHz, and when the applied electric field parameter is 1 MHz, the Class I water contains the least ice crystals, so that low-temperature damage of the biological material caused by formation of the ice crystals can be effectively inhibited, and the cryopreservation efficiency can be improved.

Embodiment 2

The Class I water and NaCl powder with the purity of 99.99% from the Alfa Aesar company are adopted to prepare normal saline which serves as an experiment sample, and a Q2000 DSC analyzer of the TA company is selected as the differential scanning calorimeter 1. The experiment steps are as follows.
1) The experiment module of the differential scanning calorimeter 1 is opened, the reference crucible 5 and the microelectrode crucible 6 are placed at corresponding locations, the electrode wires 65 of the microelectrode crucible 6 are connected to the signal generator 3, and signal parameters to be output are set.
2) 4 µl of the normal saline is sucked into the electrodes 63 in the microelectrode crucible 6 in two times by using a microsyringe with the specification of 2 µl, the ceramic crucible lid 62 is closed, and the condition that the normal saline is completely injected into the gap between the electrodes 63 can be ensured in an operation process.
3) The temperature control program matched with the differential scanning calorimeter 1 is set in the computer 2, and the temperature control program includes four stages as follows: stage 1, an initial temperature is set to be 4° C., and kept for 2 min; stage 2, the temperature is reduced to −60° C. at the rate of 3° C./min; stage 3, the temperature of −60° C. is kept for 3 min; and stage 4, the temperature is increased to 10° C. at the rate of 3° C./min. After the program is set, the experiment module is closed, and the temperature control program is started.
(4) When the first stage is finished and the second stage is about to be started, the signal input button of the signal generator 3 is pressed down, and an applied electric field applied to the normal saline is started in a cooling process of the second stage.
(5) After the second stage is finished, the signal input button of the signal generator 3 is rebounded, and the applied electric field applied to the normal saline is stopped at the third stage and the fourth stage.
6) At the end of stage 4, a heat flow curve is exported by the differential scanning calorimeter 1 and stored in the computer 2.

Figure 6:
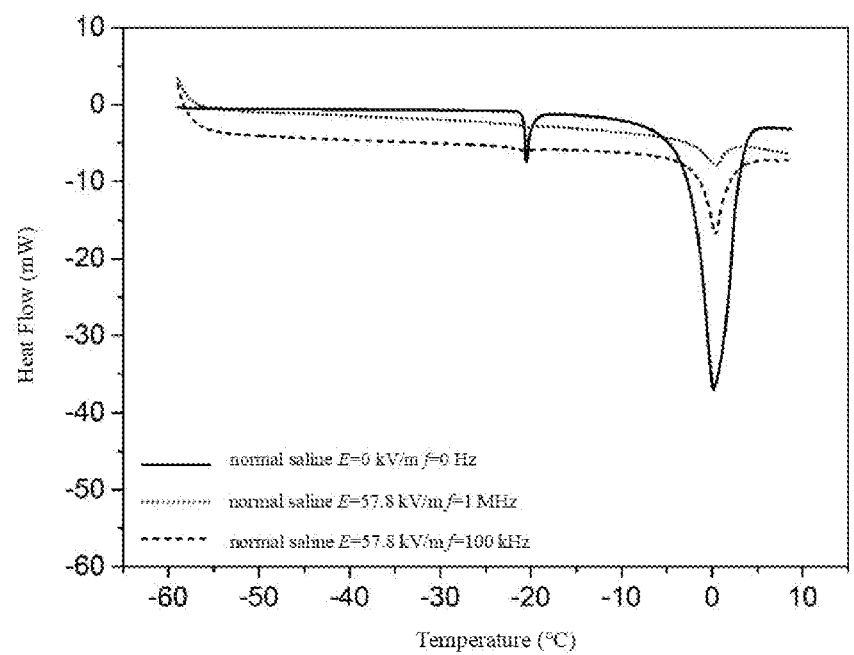

FIG. 6 shows DSC heat flow curves obtained by respectively applying 0 Hz, 100 kHz, 1 MHz electric field parameters to 4 µl of the normal saline during a low-temperature freezing process and reheating, wherein a low-temperature peak is a melting peak of a eutectic mixture, i.e., salt-containing ice, formed by adding salt ions, and a high-temperature peak is the melting peak of pure water ice. It can be seen that after the electric field is applied to the normal saline, in the low-temperature freezing process, the low-temperature peak of the normal saline disappears, the height of the melting peak is obviously reduced, and the area of the peak is obviously reduced. Therefore, formation of the ice crystals can be effectively reduced by applying the electric field to the normal saline during the low-temperature freezing process; and it can be deduced from FIG. 6 that an optimal applied electric field parameter of the embodiment is 1 MHz, and when the applied electric field parameter is 1 MHz, the normal saline contains the least ice crystals, so that low-temperature damage of the biological material caused by formation of the ice crystals can be effectively inhibited, and the cryopreservation efficiency can be improved.

Therefore, the DSC electrode system capable of applying the electric field can be applied to the field of cryopreservation of the biological material, and has certain industrial practicability.

The fundamental principles of the present application have been described above in combination with the specific embodiments, but it should be noted that the advantages, effects, etc., mentioned in the present application are for the illustrative purpose only and not intended to construct a limitation, and these advantages, effects, etc., cannot be considered essential to each embodiment of the present application. In addition, the specific details disclosed above are for the illustrative purpose and understanding only, not for limitation, and the above details do not construct the limitation that the present invention to must be implemented with the specific details described above.

The above description has been presented for purposes of illustration and description. In addition, the description is not intended to limit the embodiments of the present invention to the forms disclosed herein. Although a number of examples and embodiments have been discussed above, those skilled in the art will recognize certain variations, modifications, alterations, additions, and sub-combinations thereof.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:
1. A DSC (Differential Scanning calorimetry) electrode system capable of applying an electric field, comprising:
a differential scanning calorimeter for detecting heat flow curves of a sample under freezing and reheating conditions caused by different electric field parameters;
a computer connected to the differential scanning calorimeter for transmitting signals and recording experimental results, and the computer further comprising a temperature control program; wherein the program comprises four stages as follows: stage 1, an initial temperature is set for a first time period; stage 2, the temperature is reduced to a second temperature at a first rate; stage 3: the temperature of the second temperature is kept for a second time period, and stage 4, the temperature is increased to a third temperature at a second rate;

a self-pressurization liquid nitrogen tank connected to the computer and the differential scanning calorimeter for cooling an inside of an experiment module of the differential scanning calorimeter;

a microelectrode crucible that comprises a ceramic crucible, a ceramic crucible lid, two half-cylindrical-shaped electrodes, electrode wires and welding spots, wherein the ceramic crucible holds the two half-cylindrical-shaped electrodes and the sample, the ceramic crucible lid prevents the sample from being evaporated, the two half-cylindrical-shaped electrodes generate an electric field and are respectively fixed in the ceramic crucible, a gap is reserved between the half-cylindrical-shaped electrodes for storing the sample, the electrode wires connect the two half-cylindrical-shaped electrodes with a signal generator, the welding spots are at upper ends of the two half-cylindrical-shaped electrodes and connect the two half-cylindrical-shaped electrodes with the electrode wires; the half-cylindrical-shaped electrodes are fixed to an inner side wall of the ceramic crucible through a two-liquid mixed hardening glue, and bottoms of the two half-cylindrical-shaped electrodes are in full contact with a bottom of the ceramic crucible, so that the bottoms of the two half cylindrical-shaped electrodes or the bottom of the ceramic crucible are/is prevented from being polluted by the mixed hardening glue, the two half-cylindrical-shaped electrodes are oppositely placed and have smooth surfaces, and planes of the two half cylindrical-shaped electrodes are parallel to each other and are in contact with the sample;

the signal generator comprising a signal input button, connected to one end of each electrode wire and used for providing an electrical signal so as to apply the electric field to the sample and the signal input button is configured for controlling start and stop of the applied electric field for the microelectrode crucible; and a reference crucible that comprises a ceramic crucible and a ceramic crucible lid of which the specifications are consistent with the specifications of the ceramic crucible and the ceramic crucible lid of the microelectrode crucible, and is for serving as an experiment reference in which the electric field is not applied to the sample, and is disposed side by side with the microelectrode crucible;

wherein when the first stage is finished and the second stage is about to be started, the signal input button of the signal generator is pressed down, and an applied electric field applying 0 Hz, 100 kHz, and 1 MHz electric field parameters during a low-temperature freezing process is started in a cooling process of the second stage; after the second stage is finished, the signal input button of the signal generator is rebounded, and the applied electric field is stopped at the third stage and the fourth stage; and at the end of the fourth stage, a heat flow curve is exported by the differential scanning calorimeter and stored in the computer;

wherein the electrode wires are enameled wires with insulated outer surfaces; one end of each electrode wire is connected to the corresponding half-cylindrical-shaped electrode in a welded manner, while the other end of each electrode wire is connected to a signal output end of the signal generator through a transmission line; diameters of the electrode wires are 0.1 mm-0.2 mm; and the gap reserved between the two half-cylindrical-shaped electrodes ranges from 0.2 mm to 1.0 mm;

wherein two openings are drilled in symmetrical locations on two sides of the ceramic crucible lid, and depths of the openings are equivalent to a thickness of the ceramic crucible, which ensures that the ceramic crucible lid fits the ceramic crucible and the electrode wires penetrate through the openings, and meanwhile also ensures that moisture in the sample is prevented from being evaporated;

wherein the DSC electrode system capable of applying the electric field monitors heat flow changes of the sample, wherein the sample is a biological material, in real time during freezing and reheating when an applied electric field exists, compares the different electric field parameters on formation of ice crystals in the biological material and determines an applied electric field parameter that effectively inhibits the low-temperature damage of the biological material, and improves the cryopreservation efficiency of the biological material.

2. The system according to claim 1, wherein the two half-cylindrical-shaped electrodes are made from a corrosion-resistant conductive material.

3. The system according to claim 2, wherein the corrosion-resistant conductive material is made from one of platinum, copper, gold, and stainless steel.

4. The system according to claim 1, wherein the electric field generated by the two half-cylindrical-shaped electrodes is a uniform electric field.

* * * * *